(No Model.)
H. COMPTON.
COMBINED PLANTER AND FERTILIZER DISTRIBUTER.
No. 528,364. Patented Oct. 30, 1894.
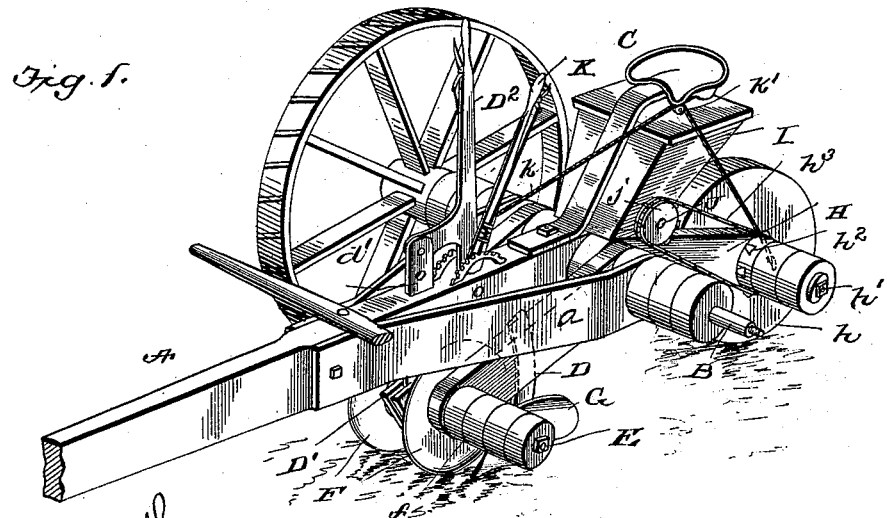
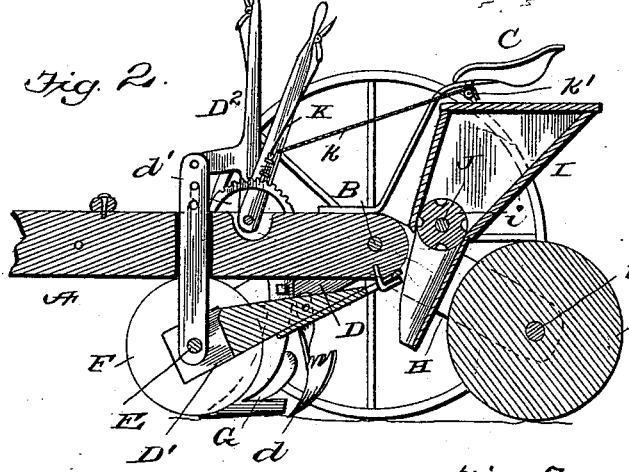
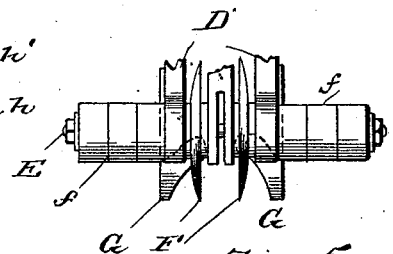
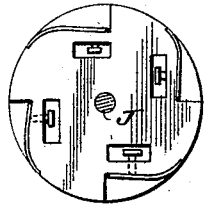
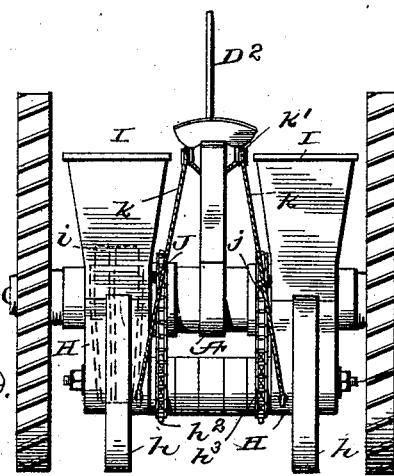
Witnesses:
Inventor.
Harmon Compton
By R. S. & A. P. Lacey
his Attorneys.

UNITED STATES PATENT OFFICE.

HARMON COMPTON, OF LYNNHAVEN, VIRGINIA.

COMBINED PLANTER AND FERTILIZER-DISTRIBUTER.

SPECIFICATION forming part of Letters Patent No. 528,364, dated October 30, 1894.

Application filed January 5, 1894. Serial No. 495,859. (No model.)

*To all whom it may concern:*

Be it known that I, HARMON COMPTON, a citizen of the United States, residing at Lynnhaven, in the county of Princess Anne, State of Virginia, have invented certain new and useful Improvements in a Combined Planter and Fertilizer-Distributer; and I do hereby declare the following to be a full, clear, and exact description of the invention, such as will enable others skilled in the art to which it appertains to make and use the same.

This invention relates to agricultural implements designed for cultivating, tilling, planting, weeding and digging potatoes.

The object of the invention is the provision of an implement which is designed to facilitate the performance of the aforesaid operations with slight changes, shifting and readjustment of the several parts.

The invention consists of the combination with dish shaped cutters which are interchangeable and interchangeable turning plows whereby the soil can be thrown to or from a row as required.

The invention further consists of the combination with an implement of the character herein set forth of planting attachments which can be instantly thrown into or out of operative relation as desired.

The invention also further consists of the instrumentalities whereby the various parts such as the turning plows, the rotary cutters and the planting attachments can be adjusted to any required distance apart at the will of the operator.

The invention also consists of the novel features and the peculiar construction and combination of the parts which will be hereinafter more fully described and claimed and which is shown in the annexed drawings, in which—

Figure 1 is a perspective view of an agricultural implement of the type herein set forth embodying my invention. Fig. 2 is a central longitudinal section of the implement, Fig. 3 is a rear view showing the implement adapted for planting two rows. Fig. 4 is a detail view showing the rotary cutters and turning plows in an inverse position to that shown in Fig. 1. Fig. 5 is a detail view of the fertilizer distributing wheel showing the means for adjusting the capacity of the fertilizer receiving pocket.

The pole or tongue A is loosely mounted at its inner end upon the axle B and is braced by the hounds *a* through the rear ends of which the said axle loosely passes.

The seat C is mounted on the inner end of the pole or tongue and projects in the rear of the axle so that when the driver is perched thereupon the weight of the pole or tongue will be relieved from the animal's neck as will be readily understood.

D D represent two forwardly extending beams which are loosely mounted at their rear ends on the axle B.

A shaft E is mounted in the forward end of the beams D and extends parallel with the axle.

A pair of dish shaped rotary cutters F are mounted upon the shaft E and are spaced the required distance apart by washers or ring sections *f*. These washers or ring sections *f* may be of different widths and are interchangeable upon the shaft E to admit of the rotary cutters *f* being spaced the required distance apart. These rotary cutters F can be disposed so as to have the dished or concave portion face either in or out as required. To effect this result the shaft E is withdrawn and the washers or ring sections and rotary cutters strung thereon as desired.

Two turn plows G are secured by their standards to the beams D in such a manner as to be readily detached therefrom and have their position relatively interchange to turn the furrow in or out. When the plows are arranged to throw the furrow outward the rotary cutters run close to and practically constitute rotary landsides to cut cleanly through roots and prevent the plant being dragged and pulled from the ground. When the rotary cutters and plows are relatively disposed so that the furrow is thrown inward, the said rotary cutters act as protectors and prevent the earth being thrown upon the plants to such an extent as to cover them up. This position of the cutters and plows is most clearly shown in Fig. 4.

A third beam D' is pivoted at its inner end to the pole or tongue and is mounted in its forward end on the shaft E. A potato digging plow $d$ is attached to the beam D' and is provided at its upper edge with a series of fingers which assist in removing the earth from the uprooted vegetables. For cultivating purposes this potato digging plow $d$ will be replaced by a small cultivator shovel. Not shown. A lever $D^2$ is pivoted on the tongue and is connected by link $d'$ with the beams D' in such a manner as to admit of the vertical adjustment of the shaft E when it is desired to raise and lower the cutting disk and plows carried by the beams D D'. This lever $D^2$ will be held at the adjusted position by the usual notched segment and hand latch.

The planting attachment consists essentially of two rearwardly extending beams H which are mounted upon the axle B and have a covering wheel $h$ journaled between their rear ends. The hopper I is divided into two compartments, one for fertilizer, the other for the seed to be planted. Two spouts are provided, one for each compartment of the hopper. A feed wheel or disk $i$ is provided for each delivery spout and is provided in its periphery with pockets to receive the fertilizer or seed as the case may be. The feed wheels are mounted on a common shaft J which has a sprocket wheel $j$ at one end. A corresponding sprocket wheel $h^2$ is placed upon the axle $h'$ on which is mounted the covering wheel $h$. A sprocket chain $h^3$ passes around the sprocket wheel $h^2$ and $j$ to rotate the feed wheel $i$ from the said covering wheel $h$. As shown in Fig. 1 a single planting attachment is provided and located immediately in the rear of the tongue. Obviously, as many of these planting attachments may be provided as are found necessary. In Fig. 3 two such planting attachments are employed and located a proper distance apart corresponding with the desired width at which it is designed to plant the rows apart.

In order to facilitate the elevating of the covering wheel when turning at the end of a row a chain or cord $k$ is provided and attached at one end to one of the beams H and at its forward end to a lever K mounted on the pole or tongue A. This cord passes over a pulley $k'$ provided on the seat C. When it is desired to elevate the opening devices and planting attachments both the levers $D^2$ and K are operated in a manner to effect the desired result as will be readily understood.

The planting attachments can be adjusted to any point on the axle by means of the interchangeable washers $f$ by withdrawing the axle after removing one of the wheels and stringing the said washers or spacing rings and the several beams thereon so that the parts will occupy the required relative position.

Having thus described my invention, what I claim, and desire to secure by Letters Patent, is—

1. In an agricultural implement of the character herein set forth, the combination of a shaft E, dished shaped rotary cutters mounted on the said shaft, spacing rings or washers interchangeably mounted on the said shaft to enable the said cutters being spaced the required distance apart, and interchangeable turning plows carried by the said beams and adapted to turn the furrow in or out as required, substantially as set forth.

2. In an agricultural implement of the character herein set forth, the combination of beams D, shaft E carried by the said beams, dish shaped rotary cutters and interchangeable washers or spacing rings mounted on the said shaft, turning plows removably attached to the said beams, a third beam D' mounted on the said shaft and adapted to carry a digger, and means substantially as described for raising and lowering the said beams, substantially as described for the purpose set forth.

3. In an agricultural implement the combination of an axle, interchangeable washers or spacing rings mounted on the said axle, and planting attachments mounted upon the said axle and spaced the required distance apart by proper adjustment of the said washers or spacing rings, substantially as set forth.

In testimony whereof I affix my signature in presence of two witnesses.

HARMON COMPTON.

Witnesses:
VAN BUREN HILLYARD,
ALLEN W. MALLERY.